Sept. 2, 1969        C. L. KIMBELL        3,464,799
GAS DETECTOR
Filed June 14, 1965        2 Sheets-Sheet 1
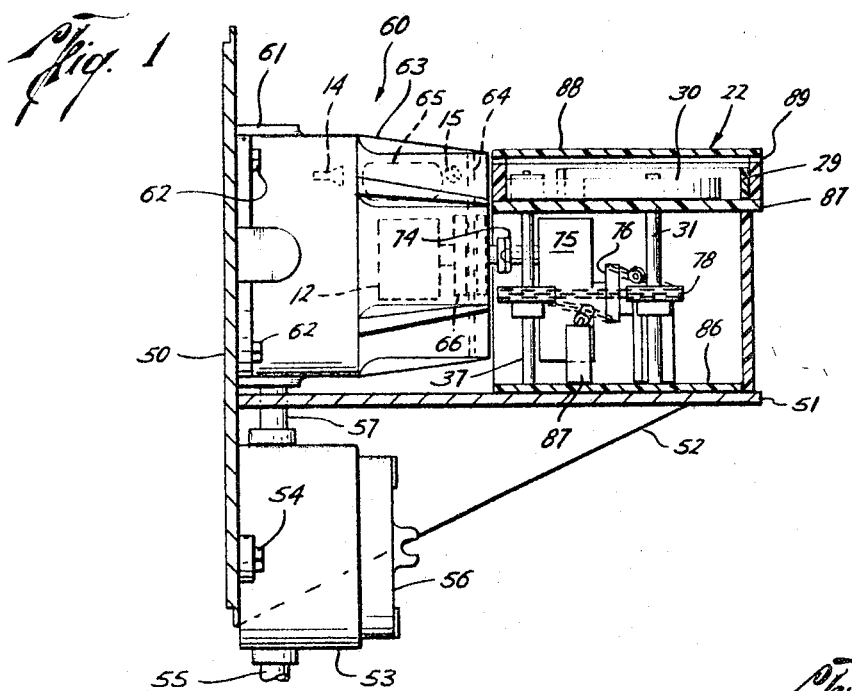
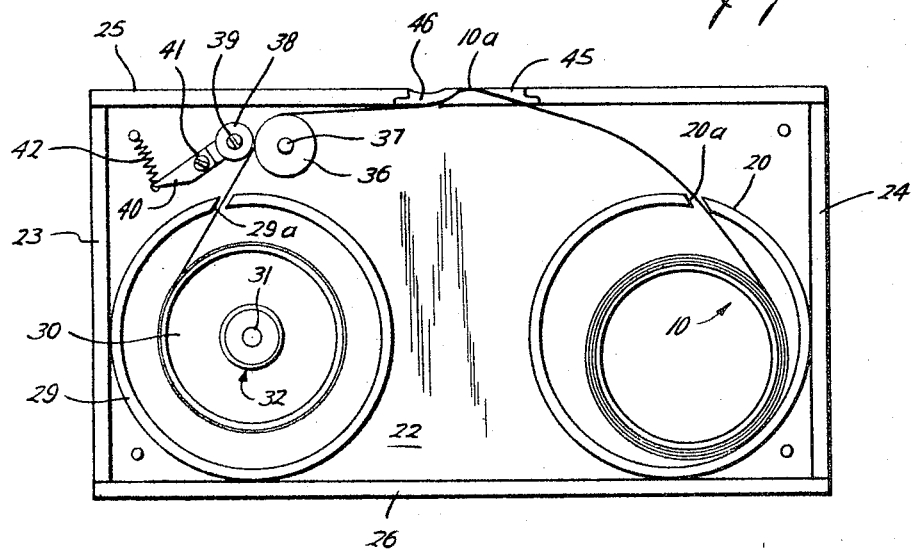
Charles L. Kimbell
INVENTOR.
BY Hayden & Pravel
ATTORNEYS

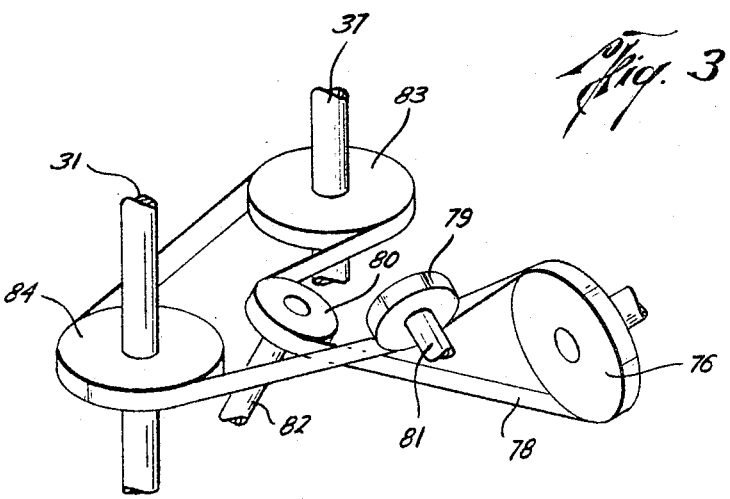
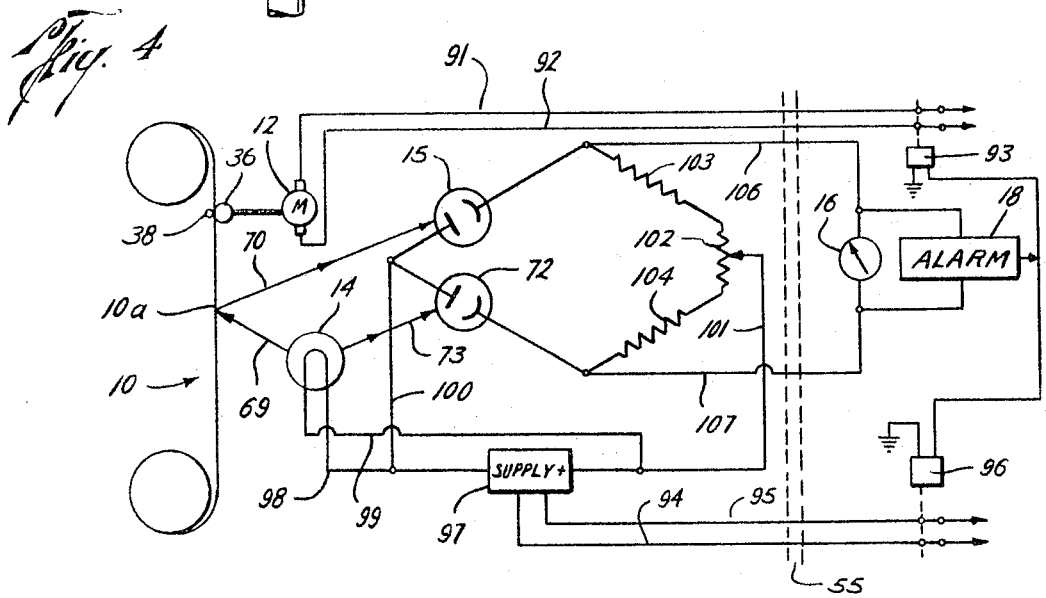
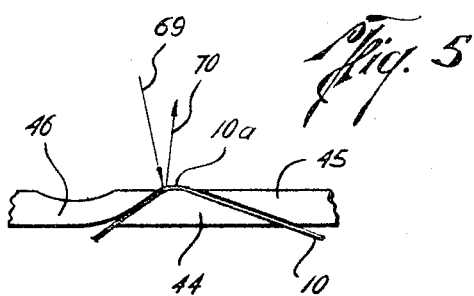
Charles L. Kimbell
INVENTOR.
BY Hayden & Pravel
ATTORNEYS United States Patent Office 3,464,799
Patented Sept. 2, 1969

3,464,799
GAS DETECTOR
Charles L. Kimbell, P.O. Box 19035,
Houston, Tex. 77055
Filed June 14, 1965, Ser. No. 463,678
Int. Cl. G01n 27/62, 29/02
U.S. Cl. 23—254                                    8 Claims

ABSTRACT OF THE DISCLOSURE

A gas detector which moves an indicator strip at a constant rate for continuously exposing a new portion of the strip to a gas while simultaneously measuring or sensing light reflected by the exposed portion of the strip. Such detector has a portion thereof subject to cause an explosion, such as an electric motor, in an explosion-proof housing while the strip is in a separate sealed container and has a portion thereof passing through a slot for exposing to the gas to be detected.

---

In the vicinity of oil refineries, chemical plants, and the like, it is not uncommon for various and sundry gases which escape to the atmosphere to be hazards to health and safety. It may be appreciated that even if a small amount of gas is allowed to concentrate, dangers exist, and even gas concentrations as small as a few parts per million (such as carbon monoxide or hydrogen sulfide) constitute serious health hazards. In addition to the danger to workmen in the vicinity of gas leaks or the like, the possibility exists that the gas concentration in the atmosphere might support combustion on occurrence of an electrical spark. The difficulties in detecting and indicating the presence of a selected gas in the atmosphere is made exceedingly difficult by the extensive nature and widespread installation of the chemical plants or the like.

It may be appreciated that chemical plants are sufficiently large that they spread over large areas, and many plants are essentially automatic so that it is not possible to rely on the olfactory senses of workmen who are not all about the plant site. Moreover, some dangerous gases are odorless without regard to concentration and other gases can be dangerous in such small concentrations that odors are not noticed. In all events, it will be recognized that the safety and health of those working in chemical plants, whether indoors or in the open, is endangered by gases in the air.

With a view of these circumstances, it will be appreciated that a remote indication of a selected gas in the atmosphere is highly useful, both from the point of view of the health and safety of workmen in the vicinity and also from the point of view of preventing or controlling activities in the vicinity of the gas to avoid ignition of the gas if it is combustible. Therefore, the subject matter of this invention provides a remote indicating gas detector which remotely indicates gas concentrations of the atmosphere immediately surrounding the detection device. Workmen and plant employees are protected by having available a read out of gas concentration to be forewarned before entering the vicinity of the detector.

An object of this invention is to provide a new and improved remote indicating gas detector which can be installed and operated in an atmosphere containing explosive gases.

One object of the present invention is to provide a new and improved gas detector operable on the change in color of a chemical indicator without regard to variations in the chemical indicator.

Another object of the present invention is to provide a new and improved gas detector for minute traces of gas which, on indication of alarm conditions, cuts off power to the detector and other devices in the vicinity.

A further object of the present invention is to provide a new and improved gas detector providing an alarm condition indicator adapted to be positioned several hundred feet away.

One important object of the present invention is to provide a new and improved gas detector which forms a permanent record of gas levels in the atmosphere during a period of time.

Yet another object of the present invention is to provide a new and improved gas detector apparatus operable with any one of a number of chemical indicators without modification.

Still a further object of the present invention is to provide a continuous indication of gas concentration with rapid response to changing conditions as opposed to sampling devices which provide only periodic indications.

Another object of the present invention is to provide a new and improved gas detector placing all electric apparatus within an explosion-proof housing while yet positioning the chemical indicator in the atmosphere for exposure to the selected gas.

Still a further object of the present invention is to incorporate electrical apparatus within a readily available explosion-proof housing approved by U.L. with linkage provided through the housing to expose a chemical indicator to atmosphere.

An additional object of the present invention is to provide a new and improved gas detector exposing chemical indicator in the form of a member which is exposed and stored.

A further object of this invention is to provide a new and improved gas detector in a housing having a window of nonmagnetic material through which a magnetic clutch couples power from a motor within the explosion-proof housing to a chemical indicator transport system for exposing a chemical indicator to atmosphere while isolating the electric motor from atmosphere.

Other objects and advantages of the present invention will become more readily apparent from an examination of the enclosed specification and drawings wherein:

FIG. 1 is a side view, partly in section, of the gas detector of this invention;

FIG. 2 is a top view of a container for a chemical indicator to be exposed to gases in the atmosphere;

FIG. 3 is a pictorial view of power transfer means providing continuous exposure of a portion of the chemical indicator;

FIG. 4 is a schematic wiring diagram relating the chemical indicator to circuitry means providing an output measure of gas concentration in the atmosphere; and FIG. 5 is an enlarged view of a portion of FIG. 2 illustrating the chemical indicator at an aperture for exposing same to the atmosphere.

Considering the invention broadly, attention is directed to the schematic wiring diagram of FIG. 4 which symbolically represents a chemical indicator at 10 which is driven by a motor 12 to expose the portion 10a for reaction with the selected gas in the atmosphere. A light source 14 illuminates the portion 10a which is discolored or otherwise altered by the selected gas in the atmosphere to a variable extent as indicated by reflected light detected by a photocell 15. The photocell 15 is connected to a remote indicating device 16 which provides an indication of the amount of gas in the atmosphere, and which device is also connected to limit means 18 which sounds an alarm should the indicator 16 exceed a predetermined level. The means 18 is also adapted to disrupt electrical power to apparatus in the vicinity of the gas detector should it be desired to prevent explosions triggered by electrical sparks. As will be described in greater detail, the invention provides an unmanned gas detector which monitors gas concentration to protect the safety and health of workmen in the vicinity and also protects the plant or refinery from explosion of dangerous concentrations of combustible materials.

Attention is directed to FIG. 2 which illustrates fresh, unexposed chemical indicator 10 placed in a cylindrical container 20 having a slot 20a for feeding the continuous member 10 therethrough as will be described. The chemical indicator 10 is preferably formed as a continuous member, and may be by way of example and not limitation a paper strip impregnated with the proper chemicals to provide a discoloration on exposure to the selected gas in the atmosphere. For instance, chemical indicators well known to those skilled in the art are responsive to only a few parts per million gas concentration of gases such as hydrogen sulfide or carbon monoxide which are lethal gases. It is possible to provide a chemical indicator in the form of a paper strip whch is conventionally a light color before exposure but which turns to a darker color, such as gray, or even black, on exposure to the gas to which it is sensitive so as to effect a discolorization relating to the time of exposure and concentration of gas in the atmosphere.

A container 22 which is formed of end walls 23 and 24 and parallel walls 25 and 26 protects the indicator 10 before exposure to the atmosphere and also protects same after exposure so that it is possible to accumulate over a period of time a record in the form of discolorations of the indicator 10 which may be interpreted and related to the time of operation of the gas detector of this invention. A circular container 29, which is slotted at 29a, accumulates the exposed indicator 10 on a take-up drum 30. The take-up drum 30 is rotated by a drive shaft 31 which is engaged with the drum 30 by a slip clutch which is indicated generally at 32. The shaft 31 rotates faster than the drum 30 but slips sufficiently to maintain the indicator 10 in tension for winding same neatly about the periphery of the drum 30.

A capstan 36 engages the indicator 10 and is rotated at a constant velocity by a shaft 37 so that the time rate of exposure of the portion 10a is constant, and time fluctuations in the discoloration of the indicator 10 by exposure are avoided.

Contact of the capstan 36 against the indicator 10 is maintained by an idler wheel 38 mounted on a shaft 39 which is carried on a pivoted lever 40. The lever 40 is mounted loosely on a pivot member 41, and a spring 42 pivots the lever 40 to carry the idler 38 toward the capstan 36 for clamping the indicator 10 therebetween to maintain constant engagement and therefore constant velocity of the indicator 10 during operation of the gas detector of the present invention.

The container indicated generally at 22 may be fabricated of plastic or some other suitable material. The only exception is that portion of the container which aids in providing aperture means for exposing the portion 10a of the indicator 10. Attention is directed to FIG. 5 for an enlarged view of the aperture means which illustrates the indicator 10 exposed at the portion 10a. A member 44 constructed in the illustrated manner is provided to define a pathway along its edge for the chemical indicator 10 as it is pulled along the outer surface of the member 44 by the tape transport means better illustrated in FIG. 2. The member 44 directs the indicator 10 to a point on the exterior of the container 22 for exposure to the gases in the atmosphere with the indicator 10 traversing one face of the member 44 and in firm contact with a flexible member 45 which prevents gas leakage into the container 22. The member 45 is preferably a portion of the wall defining the container 22 and may be fabricated of some pliable material such as silastic or the like which is adapted to contact the member 44 to seal against leakage of atmospheric gases into the container 22 and prematurely exposing the indicator stored therein. While the member 45 contacts the indicator 10 as it is pulled from within the container 22 to a point exposed to the atmosphere, a somewhat similar flexible member 46 is provided to contact the other face of the member 44 and the indicator 10 as the indicator transport means pulls the indicator from the exposed atmosphere exterior the container 22 along the face of the member 44. Reference is made to the curvature of the means 46 shown in FIG. 5 to illustrate one means of providing a yieldable member contacting the member 10 which is pulled toward the member 46, but wherein the curvature prevents the member from doubling under on itself.

The flexible members 45 and 46 are joined with the wall member 25 of the container 22 as shown in FIG. 2 and may be attached thereto by glue or other adequate means for securing the flexible members to affect a seal against leakage of atmospheric gases into the container 22.

Attention is directed to FIG. 1 which illustrates means for exposing the chemical indicator 10 to gases in the atmosphere which means may be installed in the vicinity of apparatus considered likely to vent such gases to atmosphere. A mounting plate 50 is secured to a horizontal support plate 51 anchored in position by triangular bracket 52. A junction box 53 is connected to the plate 50 by bolts 54 or other suitable means and provides a sealed, explosion-proof chamber for making up electrical connections or the like. Electrical conductors including at least two wire power distribution cables and cables to the indicator 16, as will be described in detail hereinafter, are provided in a conduit 55 emerging from the junction box 53. A threaded plug-in member 56 is secured to the junction box 53 and is easily removed to permit access to the conduit 55 for ease of maintenance. The junction box 53 is preferably some explosion-proof chamber approved by U.L., such as Model GUE, made by the Crouse-Hinds Co.

The junction box 53 is connected by way of a conduit 57 to an explosion-proof housing indicated generally at 60. The explosion-proof housing 60 in the preferred embodiment is manufactured by the Crouse-Hinds Company and bears Model No. EMH 521–20,000. The housing 60 includes two portions, one portion being indicated at 61 which is secured to the plate 50 by means of bolts 62, and which portion provides a cylindrical chamber which is sealed at the point of entrance of the conduit 57.

A portion 63 of the housing 60 is provided with a set of threads for engaging the portion 61 and joining therewith as illustrated in FIG. 1. The portion 63 provides an explosion-proof chamber when joined to the portion 61 and isolates the atmosphere external to the device from electrical equipment in the housing and the occurrence of electrical sparks. In addition, the portion 63 includes a window 64 made of a transparent and nonmagnetic material, such as glass, which is shown in dotted line representation in FIG. 1. The window 64 provides access to the exterior of the explosion-proof housing 60 for various means of the present invention as will be described.

The conduit 57 provides electrical power to the housing 60 for operation of the motor indicated in dotted line at 12 and the light source indicated in dotted line at 14. The light source 14 is communicated by light directing means in dotted line at 65 which means 65 extends to the window 64 for directing a beam of light therethrough as represented schematically in FIG. 4. In addition to the light-gathering means 65, communication is provided through the window 64 by a magnetic clutch 66 which is secured to the shaft of the motor 12 and includes a clutch plate interiorly of the housing 60 and a counterpositioned clutch plate on the opposite side of the window 64. The clutch plates are coupled together by magnetic flux lines through the window 64. As will be appreciated by those skilled in the art, rotation of the clutch plate connected to the motor 12 magnetically imparts rotation to the clutch plate positioned externally of the window 64 and provides means for coupling the required mechanical energy to the exterior of the explosion-proof housing 60 without forming or fabricating additional holes therein and risking loss of U.L. approval of the housing.

Attention is directed to the drawings for a description of apparatus for converting discoloration of the indicator 10 into a signal representing gas concentration in the atmosphere. The light source provided at 14 shown in FIG. 1 emits light which is directed by the member 65 through the transparent window 64 to fall on the portion 10a of the chemical indicator which is exposed to the atmosphere. Attention is directed to FIG. 5 which shows the incident path of light symbolically represented by the arrow 69 and the reflected light which is indicated by the arrow 70. The light is preferably directed at the edge of the aperture whereby the portion of indicator which had fully traversed the aperture from the right-hand edge of the aperture as shown in FIG. 5 toward the left-hand edge is provided sufficient time of exposure to obtain sufficient discoloration. That is to say, light is directed at the portion of exposed indicator in the aperture and not at the chemical indicator 10 as it emerges from under the lip of the flexible member 45.

The photoelectric cell 15, a semiconductor device in the preferred embodiment, is positioned within the chamber 60 and detects the reflected light 70, and any fluctuations thereof, to operate indicating circuitry to be described to provide a read out of the gas concentration in the vicinity of the apparatus. In addition to the photoelectric cell 15 shown in FIG. 1, an additional photoelectric cell 72 is represented schematically in FIG. 4, and the photocell 72 is positioned interiorly of the housing 60 to be exposed to light directly emitted from the light source 14 as denoted by the arrows 73 in FIG. 4 to provide an input to a bridge circuit cancelling variations resulting from changes in bulb operation, voltage fluctuations on the supply line, or the like.

The magnetic clutch 66 is connected by way of a coupling 74 to a gear box 75 of conventional construction which drives an output pulley shown in FIG. 1 at 76. The gear box 75 provides a desired rate of rotation at the pulley 76 which is related to the exposure rate preferred for the chemical indicator 10. As will be appreciated on revelation of additional details, the exposure time of the portion 10a can be varied by altering the ratio of the gear box 75, or changing other components in the device. Avoidance of fluctuations in the exposure time of the portions 10a is sometimes important and depends on using a synchronous motor and a positive drive system such as gears shown in the drawings, although other means can be provided to limit exposure fluctuations, as desired. The pulley 76 is connected to a drive chain 78 which communicates with various pulleys for imparting motion to the chemical indicator 10 as previously mentioned.

The pictorial view of FIG. 3 illustrates the pulley 76 engaged with the link chain 78 to impart rotation to the shafts 31 and 37. Idler pulleys 79 and 80 which are mounted on shafts 81 and 82 are utilized to change the plane of chain movement to enable the chain 78 to engage and drive the shafts 31 and 37 which are parallel to one another but which are perpendicular to the axis of rotation of the pulley 76. The chain 78 is engaged with a pulley 83 mounted on the shaft 37 and a pulley 84 mounted on a shaft 31 to rotate the shafts 37 and 31, respectively, to provide means continuously exposing a new portion of the chemical indicator 10.

Referring back to FIG. 1, the shafts 31 and 37 extend from a bottom plate 86 upwardly through a plate 87 and into the container indicated generally at 22. In addition to the shafts 31 and 37, suitable support means such as that indicated at 87 is provided for mounting the idler pulleys 79 and 80 in the appropriate, spaced relationship relative to the pulley 76 and the shafts 31 and 37 to provide the structure shown in FIG. 3. It will be appreciated that the power transfer means provided in FIG. 3 is the preferred embodiment although other suitable means may be used, means such as flexible drive couplings or the like.

As previously mentioned, the shaft 37 which rotates at a constant rate of velocity and drives the capstan 36 which is of a fixed radius imparts a constant linear velocity to the chemical indicator 10. Since the rate of accumulation of exposed chemical indicator 10 on the periphery of the take-up means 30 is varied, it is preferable to impart greater linear velocity to the edge of the hub 30 to maintain tension on the chemical indicator 10 as it passes through the capstan 36 and the idler pulley 38. Therefore, the shaft 31 is rotated somewhat faster than the velocity needed to take up the chemical indicator 10 with the clutch 32 provided to accommodate slippage while maintaining a tautly wrapped accumulation of the member 10 on the hub 30. Those skilled in the art can provide various clutch means 32, which may include by way of suggestion and not limitation a pair of frictionally-contacted plates which slip sufficiently to achieve proper take-up tension on the chemical indicator 10.

A top member 88 is provided for sealing the container 22 by engaging a gasket 89 which prevents atmospheric gases from entering and prematurely chemically exhausting the indicator 10 before exposure and from completely saturating the indicator 10 which had been previously exposed and thereby washing out all variations which are indicative of gas concentration in the atmosphere. In addition, the member 88 is preferably non-transparent, or an additional cover member made of nontransparent material is provided thereabove to prevent exposure to excessive sunlight. Chemical indicators are sometimes sensitive to excessive light when stored. This, in part, depends on the characteristics of the chemical indicator, it being recalled that those skilled in the art are familiar with chemical indicators sensitve to various gases in the atmosphere.

It can be observed from the sectional view of FIG. 1 that sufficient air space is provided between the container 22 and the housing portion 63 to permit atmospheric access to the exposed chemical indicator portion 10a whereby diffused gases in the atmosphere are reacted with the chemical indicator. Thus, routine use of the present invention does not require fans or other air moving devices to increase the exposure of the indicators. However, those skilled in the art can provide such air moving means should it be desired to gather and move air in the case of a very heavy gas which tends to settle or which does not otherwise diffuse properly.

The schematic wiring diagram of FIG. 4 illustrates means for providing an indication at remote apparatus several hundered feet removed from the chemical indicator 10 and the gas concentration in the vicinity of indicator 10. By way of example, such means may be placed a thousand or 1,500 feet away in the control house of a refinery or chemical plant to monitor the gas concentration in an area considered to be critical or dangerous without risking life and limb to periodically test the atmosphere. Thus, the apparatus shown in FIG. 4 includes means which are preferably installed in the explosion-proof chamber 60 and means which are preferably installed elsewhere at some desired location. The conduit 55 in FIG. 1 is connected to the explosion-proof housing 60 and is indicated symbolically at 55 in the schematic wiring diagram. It may be appreciated that the length of the conduit 55 depends on the circumstances of installation of the present invention.

Electrical power is provided over a pair of conductors indicated at 91 and 92 for the motor 12 which operates through the magnetic clutch 66 to drive the capstan 36 and to ultimately expose the indicator 10 at the portion 10a shown in Fig. 4. The conductors 91 and 92 are connected through a normally closed relay 93 and then are connected to some power source such as 110 volts, 60 c.p.s. In the schematic, the conductors 91 and 92 extend to the motor 12 within the housing 60. Additionally, a pair of conductors 94 and 95 supply electrical power from some source through the normally closed contacts of a relay 96 to a power supply 97 for operation of the light bulb 14. A pair of conductors 98 and 99 are connected from the supply 97 to the light bulb 14 and may supply any suitable voltage for operation of the bulb 14. It may be appreciated that the bulb 14 may operate on any selected voltage output by the conventional supply 97.

The supply 97 is also connected by the conductors 100 and 101 to the corners of a bridge circuit which includes photoelectric cells 15 and 72. The conductor 100 is connected between the photoelectric cells 15 and 72 while the conductor 101 communicates with the adjustable terminal of a potentiometer 102 which communicates with resistor arms 103 and 104 of the bridge circuit. Potentiometer 102 provides a zero balance adjust means whereby the bridge circuit at quiescent conditions provides a zero output signal to the measuring apparatus to be described.

A conductor 106 and a conductor 107 are connected to corners of the bridge circuit and to the indicating meter 16 which preferably includes an ammeter movement to indicate bridge unbalance which is directly related to light variations sensed by the elements 15 and 72. The provided balancing means enables a null to be achieved in the bridge circuit which is indicated by zero current flow through the meter 16 when the exposed portion 10a of the indicator 10 indicates the presence of a minimum (probably zero) concentration of the selected gas in the atmosphere. As previously mentioned, the circuit elements 15 and 72 work against one another to provide means for cancelling fluctuations of the light output of whatever origin so that the meter 16 indicates only discolorations of the indicator 10 directly related to the gas in the atmosphere. The indicator 16 is parallel with the limit means 18 which provides an alarm should the meter 16 indicate an excessive concentration of a selected gas in the atmosphere.

The preferred means is a meter relay actuated on deflection of the indicator needle in the meter 16 to a predetermined level. In the preferred embodiment, the meter relay is Model No. 351–C manufactured by Assembly Products, Inc. The alarm 18 is any audible or visual device such as a horn, buzzer, blinker, or other output means. The preferred embodiment also includes a control relay, Model No. 22–RJCC, manufactured by Sigma, which is operated by the meter relay for actuating the alarm device.

The conductors 91 and 92 might be combined with the conductors 94 and 95 so that only one relay is required to operate as power control means. Needless to say, the remote output means 16 can be adapted to interrupt current flow of any magnitude on incorporation of suitable current handling apparatus in the conductors extending to the vicinity of the means for exposing the chemical indicator. Thus, the device of the present invention may be used to interrupt current flow to large machinery or the like in the vicinity of the chemical indicator when it is believed that the machinery is capable of causing sparks which would ignite combustible gases in the atmosphere. Therefore, depending upon the current needs, the relays 93 and 96 controlled by the alarm 18 might have current handling capabilities in the range from milliamperes to several hundred amperes.

In operation, the apparatus illustrated in FIG. 1 is installed in the vicinity of suspected gas sources to test the atmosphere thereabout. On application of electric power to the motor 12 and the light bulb 14, motion is transferred while simultaneously reflected light onto the exposed portion of chemical indicator 10 to obtain an output indication at the remote indicating equipment of the gas concentration in the atmosphere. The motor 12 is operated in the conventional manner and couples torque to the magnetic clutch 66, the gear box 75, and the transmission apparatus shown in the drawings to continually expose anew a portion 10a of the chemical indicator 10.

The gas in the atmosphere discolors the indicator 10 in relation to gas concentration and alters the amount of light reflected to the circuit element 15 which is sensed by the bridge circuitry to provide a signal coupled to the indicator 16 for remote read out at a distance possibly several hundred feet from the indicator 10. The motor 12 continues to operate over an extended period of time, possibly several days or even weeks, and continues to expose a portion 10a of the member 10 and to accumulate same within the container 22 to collect a record of gas concentration in the atmosphere over a period of time. It will be appreciated that the record accumulated in the container 22 is a permanent record whereas the indicator 10 provides an instantaneous indication for the benefit of operators in the vicinity of the remote output means 16.

When the gas concentration in the vicinity of the exposed portion 10a exceeds a predetermined level, the increased discoloration of the chemical indicator 10 sufficiently alters the quantity of light falling on the circuit element 15 to cause an indication exceeding a predetermined level at the meter 16. Such an indication operates the alarm device 18. The alarm device outputs a visual or audible alarm to operators in the vicinity and also provides a signal to the relays interrupting power delivered to the apparatus of this invention, and the relays also interrupt the delivery of power to other apparatus in the vicinity of the atmosphere.

It should be noted that the present invention senses discolorations of the indicator 10 by means of reflected light from the indicator 10 as opposed to a system whereby light passes through the indicator 10 and is therefore susceptible to variations in the density or thickness of the paper base of the chemical indicator 10.

Certain alterations may be incorporated in the present invention, and an example is the provision of alternative power transfer means supplying torque to the take-up reel 30 from the gear box 75. For instance, a flexible cable drive may operate the chemical indicator transport means which are exterior to explosion-proof housing. Also, different circuitry such as a voltage amplifier may be incorporated with the present invention to provide a signal from the chemical indicator 10 to the indicating means 16.

As will be recognized by those skilled in the art, the current invention may be altered to incorporate electronic telemetry equipment instead of conventional cable conductors which communicate from the chemical indicator 10 to the remote output means 16.

As an additional alternative, the present invention might incorporate a plurality of chemical indicators 10 placed at a multitude of locations while providing signals to only one indicator 16 and alarm device 18 with interconnection being made by a commutator device which sequentially scans the multitude of inputs for the meter 16. Of course, the various forms of chemical indicators known to those skilled in the art may be placed on a continuous member such as a paper tape to provide means sensitive to a selected gas in the atmosphere for use in the present invention. As will be recognized, the utilization of various chemical indicators might provide discoloration better detected by colored light and color filters co-operating with the circuit elements 15 and 72 to sense the discoloration. Color filters placed on the semiconductor circuit elements 15 and 72 and a color lens placed adjacent the light source 14 are sufficient.

The foregoing disclosure and description of the invention is illustrative and explanatory thereof and various changes in the size, shape, and materials, as well as in the details of the illustrated construction, may be made within the scope of the appended claims without departing from the spirit of the invention.

What is claimed is:
1. A gas detector, comprising:
 (a) a housing;
 (b) a light source in said housing;

(c) an indicator strip sensitive to a selected gas in an atmosphere;
(d) means for moving said indicator strip at a constant rate for continuously exposing only the outer portion of said indicator strip to a gas as the indicator strip is moved;
(e) means for directing light from said light source to said indicator strip, said indicator strip reflecting light dependent on reaction of said indicator strip to gases in the atmosphere gas;
(f) sensor means for simultaneously measuring light reflected by each exposed portion of said indicator strip as it is exposed to the gas; and
(g) indicator means connected to said sensor means for constantly providing a measure of the concentration of the gas, which measurement is essentially independent of the thickness of the indicator strip.

2. A gas detector, comprising:
(a) a housing;
(b) a light source in said housing;
(c) an indicator strip sensitive to a selected gas;
(d) means for moving said indicator strip at a constant rate for continuously exposing a new portion of said indicator to a gas as the indicator is moved;
(e) means for directing light from said light source to said indicator, said indicator reflecting light dependent on reaction of said indicator to gases in the gas;
(f) sensor means for simultaneously measuring light reflected by each exposed portion of said indicator as it is exposed to the gas;
(g) indicator means connected to said sensor means for constantly providing a measure of the concentration of the gas;
(h) said means for moving said indicator strip including a sealed container for housing said indicator strip and sealing it from the gas except at a slotted portion through which the strip is successively fed externally of the sealed container for exposing to the gas the portion only of said strip moving across said slotted portion of said housing; and
(i) said slotted portion of said housing having a solid back in contact with one side of the portion of said strip which is being exposed at such slotted portion to thereby provide chemical reaction between the gas and the material of the strip from the exposed side inwardly for thereby providing a means for indicating the rate of reaction of the gas with the material of the strip.

3. A device for detecting a selected gas in an atmosphere likely to include explosive gases, comprising:
(a) an explosion-proof housing having a window of transparent material;
(b) a light source in said housing;
(c) an indicator disposed externally of said housing and sensitive to a selected gas in the atmosphere;
(d) means for exposing successive portions of said indicator to the atmosphere and any gases therein;
(e) means for directing light from said light source through said window to said indicator, said indicator reflecting light dependent on reaction of said indicator to gases in the atmosphere;
(f) sensor means in said explosion-proof housing for measuring light reflected by each portion of said indicator exposed to the atmosphere; and
(g) means connected to said sensor means for providing a measure of selected gas concentration in the atmosphere.

4. The detector set forth in claim 1, wherein:
(a) said means for moving said indicator strip includes a sealed container for housing said indicator strip and sealing it from the gas except at a slotted portion through which the strip is successively fed externally of the sealed container for exposing to the gas the portion only of said strip moving across said slotted portion of said housing.

5. The structure set forth in claim 3, including:
(a) an alarm means operably connected to said sensor means for producing an alarm whenever the sensor means detects a predetermined quantity of the gas.

6. The structure set forth in claim 3, including:
(a) means electrically connected to said sensor means for compensating at said indicator means for fluctuations in the intensity of the light from said light source.

7. The detector set forth in claim 3, wherein:
(a) said indicator is a strip; and
(b) said means for exposing said indicator strip includes a sealed container for housing said indicator strip and sealing it from the atmosphere except at a slotted portion through which the strip is successively fed externally of the sealed container for exposing to the gas the portion only of said strip moving across said slotted portion of said housing.

8. The detector set forth in claim 3, wherein:
(a) said indicator is a strip;
(b) said means for exposing said indicator strip includes a sealed container for housing said indicator strip and sealing it from the atmosphere except at a slotted portion through which the strip is successively fed externally of the sealed container for exposing to the gas portion only of said strip moving across said slotted portion of said housing; and
(c) said means for exposing also including an electric motor in said explosion-proof housing together with a magnetic coupling from the motor to a feed means for said indicator strip to thereby move said strip at a predetermined controlled rate.

References Cited

UNITED STATES PATENTS

| | | | |
|---|---|---|---|
| 2,345,090 | 3/1944 | Brace | 23—232 |
| 2,812,243 | 11/1957 | Goody | 23—255 |
| 2,958,517 | 11/1960 | Harker et al. | 23—259 XR |
| 2,967,946 | 1/1961 | Leisey | 250—218 |

MORRIS O. WOLK, Primary Examiner

R. M. REESE, Assistant Examiner

U.S. Cl. X.R.

23—232

Disclaimer 3,464,799.—*Charles L. Kimbell*, Houston, Tex. GAS DETECTOR. Patent dated Sept. 2, 1969. Disclaimer filed Aug. 29, 1986, by the assignee, *Tracor-Atlas, Inc.*

Hereby enters this disclaimer to claims 3, 5, and 6 of said patent.
[*Official Gazette February 17, 1987.*]

REEXAMINATION CERTIFICATE (721st)

United States Patent [19]

Kimbell

[11] B1 3,464,799

[45] Certificate Issued Jul. 14, 1987

[54] GAS DETECTOR

[76] Inventor: Charles L. Kimbell, P.O. Box 19035, Houston, Tex. 77055

Reexamination Request:
No. 90/000,043, Aug. 3, 1981

Reexamination Certificate for:
Patent No.: 3,464,799
Issued: Sep. 2, 1969
Appl. No.: 463,678
Filed: Jun. 14, 1965

Disclaimer of claims 3, 5 & 6 Filed: Aug. 29, 1986 (1075 O.G. 24)

[51] Int. Cl.$^4$ .................................... G01N 21/76
[52] U.S. Cl. .................................... 422/91; 436/44; 436/121; 436/134
[58] Field of Search .................. 422/86–88, 422/90; 242/71.2

[56] References Cited

U.S. PATENT DOCUMENTS

| | | | |
|---|---|---|---|
| 2,153,568 | 4/1939 | Johnson | 422/87 |
| 2,232,622 | 2/1941 | Moses et al. | 422/87 |
| 2,345,090 | 3/1944 | Brace | 23/232 R |
| 2,551,281 | 5/1951 | Moses et al. | 422/91 |
| 2,554,414 | 5/1951 | McClendon | 422/91 |
| 2,673,500 | 3/1954 | Cassidy et al. | 242/71.2 |
| 2,812,243 | 11/1957 | Goody | 23/232 R |
| 3,001,440 | 9/1961 | Foster | 242/199 |
| 3,093,002 | 6/1963 | Logan et al. | 73/431 |
| 3,138,084 | 6/1964 | Harvey | 242/71.2 |

OTHER PUBLICATIONS

Johnson–Williamson, Inc. advertisement at p. 16, Journal of Instrumentation Society of America, 1963.
West Instrument Corporation advertisement at p. 47, Journal of Instrumentation Society of America, 1962.
"Keeping the Proof in Explosion-Proof," at p. 60, Journal of Instrumentation Society of America, 1961.
"Hermetic Magnet-Coupling," at pp. 58–60, Product Engineering, Nov. 27, 1961.
"High Speed Driver in High Vacuum," at pp. 879–880, Review of Scientific Instruments, Aug. 1962.

*Primary Examiner*—Michael S. Marcus

[57] ABSTRACT

A gas detector which moves an indicator strip at a constant rate for continuously exposing a new portion of the strip to a gas while simultaneously measuring or sensing light reflected by the exposed portion of the strip. Such detector has a portion thereof subject to cause an explosion, such as an electric motor, in an explosion-proof housing while the strip is in a separate sealed container and has a portion thereof passing through a slot for exposing to the gas to be detected.

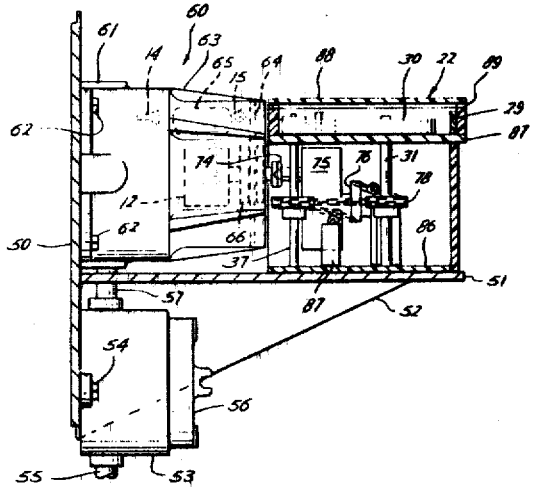

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 7 and 8 is confirmed.

Claims 3, 5 and 6 are now disclaimed.

Claims 1, 2 and 4 were not reexamined.

* * * * *